United States Patent [19]

Jeong et al.

[11] Patent Number: 5,638,125
[45] Date of Patent: Jun. 10, 1997

[54] QUANTIZATION STEP SIZE CONTROL APPARATUS USING NEURAL NETWORKS

[75] Inventors: Jechang Jeong, Seoul; Wooyoun Ahn, Suwon, both of Rep. of Korea

[73] Assignee: Samsung Electronics Co., Ltd., Kyungki-Do, Rep. of Korea

[21] Appl. No.: 499,378

[22] Filed: Jul. 7, 1995

[30] Foreign Application Priority Data

Jul. 8, 1994 [KR] Rep. of Korea .................. 94-16468

[51] Int. Cl.$^6$ ..................................... H04N 7/24
[52] U.S. Cl. ............................................. 348/405
[58] Field of Search ........................... 348/405, 419, 348/416, 415, 409, 402, 401, 400, 390, 384, 699, 700; 382/251; 375/245; 341/200; H04N 7/13

[56] References Cited

U.S. PATENT DOCUMENTS

| 5,005,206 | 4/1991 | Naillon et al. | 382/253 |
| 5,157,399 | 10/1992 | Kobayashi et al. | 341/163 |

FOREIGN PATENT DOCUMENTS

| 06164902 | 6/1994 | Japan | H04N 1/40 |

OTHER PUBLICATIONS

Wu, Yu-Jhih et al, "A Supervised Learning Neural Network Coprocessor for Soft-Decision Maximum-Likelihood Decoding", IEEE Transactions on Neural Networks, vol. 6, No. 4, Jul. 1995.

*Primary Examiner*—Tommy P. Chin
*Assistant Examiner*—Bryan S. Tung
*Attorney, Agent, or Firm*—Sughrue, Mion, Zinn, Macpeak & Seas

[57] ABSTRACT

An apparatus for controlling a quantization step size for use in an encoder which divides one image frame into first blocks and encodes the divided first blocks and transmits the encoded data at a constant transmission rate. The apparatus includes a forward analyzer for detecting image complexity with respect to each first block to be quantized, a luminance analyzer for outputting a luminance value representative of each first block, a picture quality estimator for restoring quantized data by using a quantization step size corresponding to the quantized data and generating a judgement reference value corresponding to a minimum blocking effect which cannot be visually recognized on the basis of the restored data of every second block composed of first blocks, a buffer for storing the quantized data and outputting buffer occupancy of the stored data, a neural network having stored weight values which are updated according to the judgement reference value of the picture quality estimator with respect to the quantized previous second block and the stored update rule, generating a quantization step size for the present second block on the basis of the motion vectors, and/or the image complexity and/or the luminance values with respect to the present second block, the buffer occupancy and the updated weight values, and supplying the quantization step size to the picture quality estimator, and a quantizer for quantizing data of the second blocks encoded by the encoder according to a corresponding quantization step size supplied from the neural network.

15 Claims, 3 Drawing Sheets

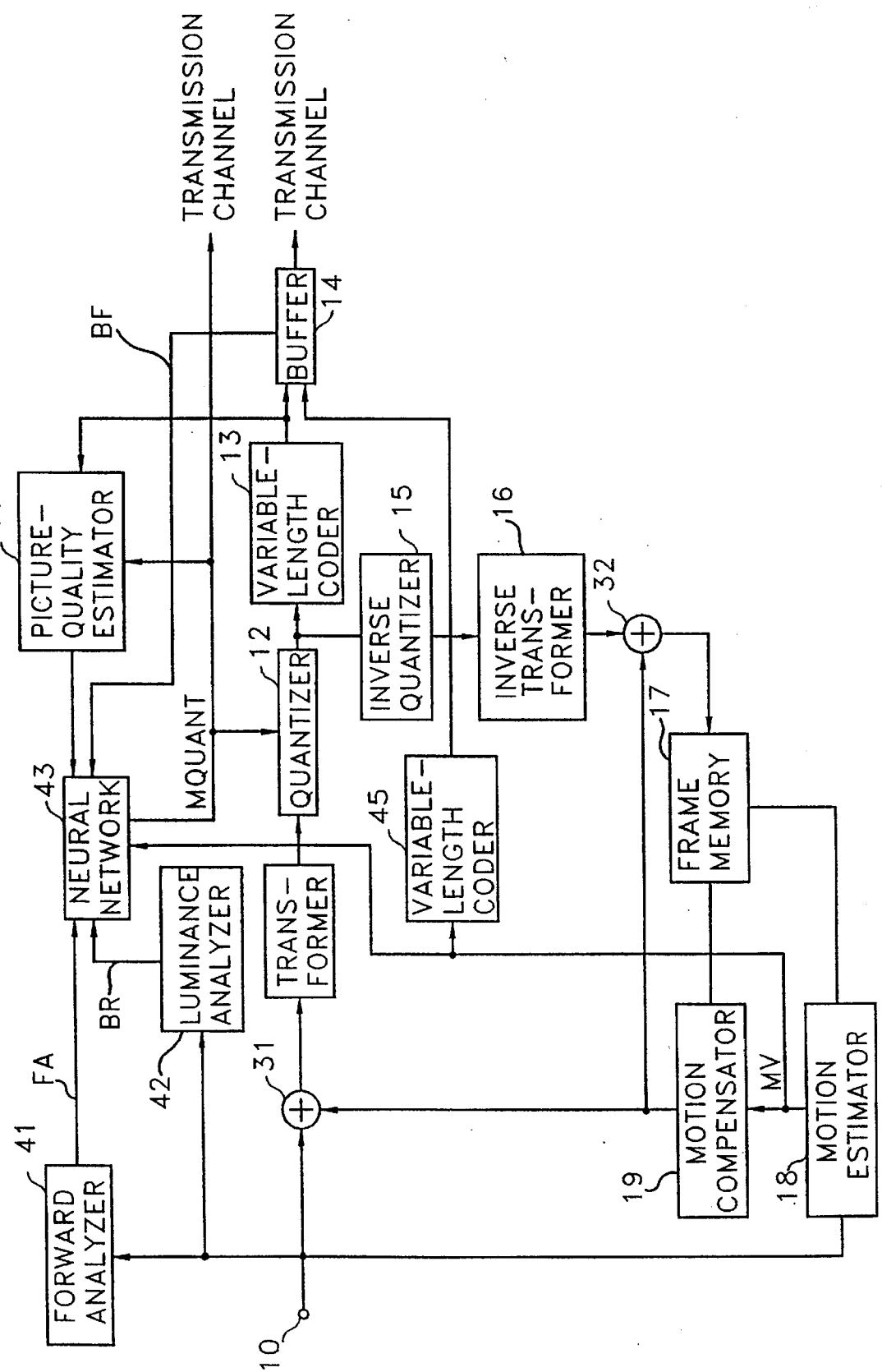

5,638,125

QUANTIZATION STEP SIZE CONTROL APPARATUS USING NEURAL NETWORKS

BACKGROUND OF THE INVENTION

1. Field of the Invention

The present invention relates to an apparatus for encoding video data, and more particularly, to an apparatus for controlling a quantization step size based on buffer occupancy and image complexity.

2. Description of Related Art

Generally, a system such as a high definition television, a digital video cassette recorder and a digital camcoder for digitally processing an image signal and an acoustic signal, digitally encodes moving pictures and acoustic signals related to the moving pictures and transmits the encoded signals, and then receives and decodes the transmitted signals. When the encoded data is transmitted through a transmission path having a constant transmission rate, an encoder needs to control an amount of the generated data. To transmit the encoded data at a constant transmission rate, an apparatus for determining a quantization step size is needed and will be described with reference to FIG. 1.

FIG. 1 is a block diagram of a general encoder for compressing moving pictures and transmitting the compressed data at a constant transmission rate. Since the FIG. 1 apparatus is well known to a person skilled in the art, the operation thereof will be briefly described below.

In FIG. 1, the video data of the present frame is applied to a subtracter 31 and a motion estimator 18. Motion estimator 18 uses video data applied from an external video data source and video data stored in a frame memory 17 and generates a motion vector signal. The motion vector signal is generated every block of N(the number of horizontal pixels)×N(the number of vertical pixels) pixels (usually 8×8 pixels) formed by the video data of the present frame, and supplied to a motion compensator 19 and a transmission channel. Motion compensator 19 supplies the video data corresponding to the motion vector among the data stored in frame memory 17 to switches 33 and 34. Switches 33 and 34 are turned on if the FIG. 1 apparatus operates in an inter-frame mode, while the former are turned off if the latter operates in an intra-frame mode. When switch 33 is turned on, subtracter 31 subtracts the data supplied via switch 33 from motion compensator 19, from the externally-supplied video data and generates differential data. On the other hand, if switch 33 is turned off, subtracter 31 supplies the externally-supplied video data to a transformer 11 as it is. Transformer 11 transforms the data output from subtracter 31 into a frequency domain transformation coefficient. Such transformation is accomplished in units of blocks. The transformation coefficients output from transformer 11 are supplied to a quantizer 12. Quantizer 12 quantizes the transformation coefficients according to a quantization step size supplied from a buffer 14 and supplies the quantized transformation coefficients to a variable-length coder 13 and an inverse quantizer 15. Such quantization is accomplished in units of blocks. Variable-length coder 13 variable-length-codes the input data on the basis of a statistical characteristic of the data. Inverse quantizer 15 inversely quantizes the transformation coefficients quantized by quantizer 12 and outputs the result to an inverse transformer 16. Inverse quantizer 15 performs an inverse processing of the signal processing of quantizer 12. Inverse transformer 16 transforms the input coefficient into spatial domain video data. An adder 32 adds the data supplied via switch 34 from motion compensator 19 and the data supplied from inverse transformer 16 and outputs the result to frame memory 17. Frame memory 17 stores the data which is sequentially updated by the externally-supplied video data, by a quantity of one frame. The data stored in frame memory 17 is used for motion estimation and compensation in motion estimator 18 and motion compensator 19, respectively. On the other hand, buffer 14 maintains a constant data transmission rate and generates a quantization step size signal every macroblock according to buffer occupancy of the stored data. The macroblock is composed of 16×16 pixels. The quantization step size signal and the encoded data output from the buffer 14 are supplied to an apparatus of FIG. 2 via a transmission channel.

The FIG. 2 apparatus which decodes the encoded motion pictures uses the quantization step size signal and the motion vector signal and decodes the data encoded by the FIG. 1 apparatus. More specifically, variable-length decoder 21 performs an inverse processing of a signal processing of variable-length coder 13. Inverse quantizer 22 inversely quantizes the data supplied from variable-length decoder 21 according to the quantization step size signal. Inverse transformer 23 transforms the input frequency domain data into a spatial domain data. Adder 35 adds the data supplied via switch 36 from motion compensator 24 and the data output from inverse transformer 23. Frame memory 25 stores the data output from adder 35 by a quantity of one frame. Motion compensator 24 reads data corresponding to the motion vector signal generated by the FIG. 1 apparatus from motion estimator 18 and supplies the read data to switch 36. The FIG. 2 apparatus which operates in this manner decodes the data encoded in the FIG. 1 apparatus. The video data output from adder 35 is displayed on a display.

However, since the above-described quantizer 12 is a kind of a loss encoder, the data prior to being quantized is not the same as the inversely quantized data after being quantized. Thus, when the video data is quantized according to a quantization step size given in units of a block having a predetermined magnitude such as a macroblock, a viewer may visually recognize a boundary line between blocks on a picture screen. Such a blocking effect is not so well recognized by the viewer in the case of a complicated picture. However, the blocking effect appearing in a simple picture, or in a picture having an edge visually recognized as an outline because of an abrupt change in brightness of an image, is well recognized by the viewer, thereby lowering the quality of the picture.

A technology of determining a quantization step size in order to provide a better quality of picture is disclosed in U.S. Pat. No. 5,038,200 to Hang issued on Aug. 6, 1991. A buffer/quantizer controller of the above prior art generates a target quantization step size signal in response to an average quantization step size signal of a previous frame and fullness indication of an output buffer.

Another prior art technology for determining a quantization step size is a rate control technology of determining a quantization step size by using image complexity supplied from a forward analyzer and a buffer state supplied from an output buffer.

SUMMARY OF THE INVENTION

Therefore, to solve the above problems, it is an object of the present invention to provide an apparatus for providing a quality of picture by which a viewer cannot recognize a blocking effect irrespective of various parameters which are varied according to changes of pictures, by determining a desired quantization step size from parameters used for determination of a quantization step size such as image complexity and a buffer state by use of a neural network.

To accomplish the above object of the present invention, there is provided an apparatus for controlling a quantization step size for use in an encoder which divides one image frame into first blocks each of which has a predetermined magnitude, encodes the divided first blocks and transmits the encoded data at a constant transmission rate, the quantization step size control apparatus comprising:

a forward analyzer for detecting image complexity with respect to each first block to be quantized;

a luminance analyzer for outputting a luminance value representative of each first block;

a picture quality estimator for restoring quantized data by using a quantization step size corresponding to the quantized data and generating a judgement reference value with which a blocking effect cannot be visually recognized at minimum on the basis of the restored data every second block composed of a predetermined number of the first blocks;

a buffer for storing the quantized data and outputting buffer occupancy of the stored data;

a neural network for storing weight values for the neural network and an update rule for updating the weight values, updating the stored weight values according to the judgement reference value of the picture quality estimator with respect to the quantized previous second block and the stored update rule, generating a quantization step size for the present second block on the basis of at least one kind of information between the image complexity and the luminance values with respect to the present second block to be quantized, the buffer occupancy output from the buffer and the updated weight values, and supplying the generated quantization step size to the picture quality estimator; and a quantizer for quantizing respective data of the second blocks encoded by the encoder according to a corresponding quantization step size supplied from the neural network.

The above object of the present invention can be also accomplished by providing an encoding apparatus for controlling a quantization step size in order to divide one image frame into first blocks each of which has a predetermined magnitude, to encode the divided first blocks and to transmit the encoded data at a constant transmission rate, the encoding apparatus comprising:

a motion compensator for generating motion vectors and motion-compensated data corresponding to each first block of a present frame on the basis of pre-stored reference frame data and present frame data to be encoded;

encoder means for generating differential data between the respective first block data of the present frame and the corresponding motion-compensated data output from the motion compensator, and transforming and encoding the differential data generated in correspondence with each first block;

a forward analyzer for detecting image complexity with respect to each first block of the present frame;

a luminance analyzer for outputting a luminance value representative of each first block of the present frame;

a quantizer for quantizing respective data of second blocks encoded by the encoder and composed of a predetermined number of the first blocks of the present frame, according to a corresponding quantization step size;

means for variable-length-coding the data quantized by the quantizer and outputting the result;

a picture quality estimator for restoring the data quantized by the quantizer and generating a judgement reference value with which a blocking effect cannot be visually recognized at minimum on the basis of the restored data every second block;

a buffer for storing the data output from the variable-length coder and outputting buffer occupancy of the stored data; and a neural network for storing weight values for the neural network and an update rule for updating the weight values, updating the stored weight values according to the judgement reference value of the picture quality estimator with respect to the quantized previous second block and the stored update rule, and generating a quantization step size for the present second block on the basis of at least one kind of information among the motion vectors, the image complexity and the luminance values with respect to the present second block to be quantized, the buffer occupancy output from the buffer and the updated weight values.

BRIEF DESCRIPTION OF THE DRAWINGS

The preferred embodiments are described with reference to the drawings wherein:

FIG. 3 is a block diagram showing an encoding apparatus using a neural network according to a preferred embodiment of the present invention.

DETAILED DESCRIPTION OF THE PREFERRED EMBODIMENT

A preferred embodiment of the present invention will be described below in more detail with reference to the accompanying drawing.

Figure 1:
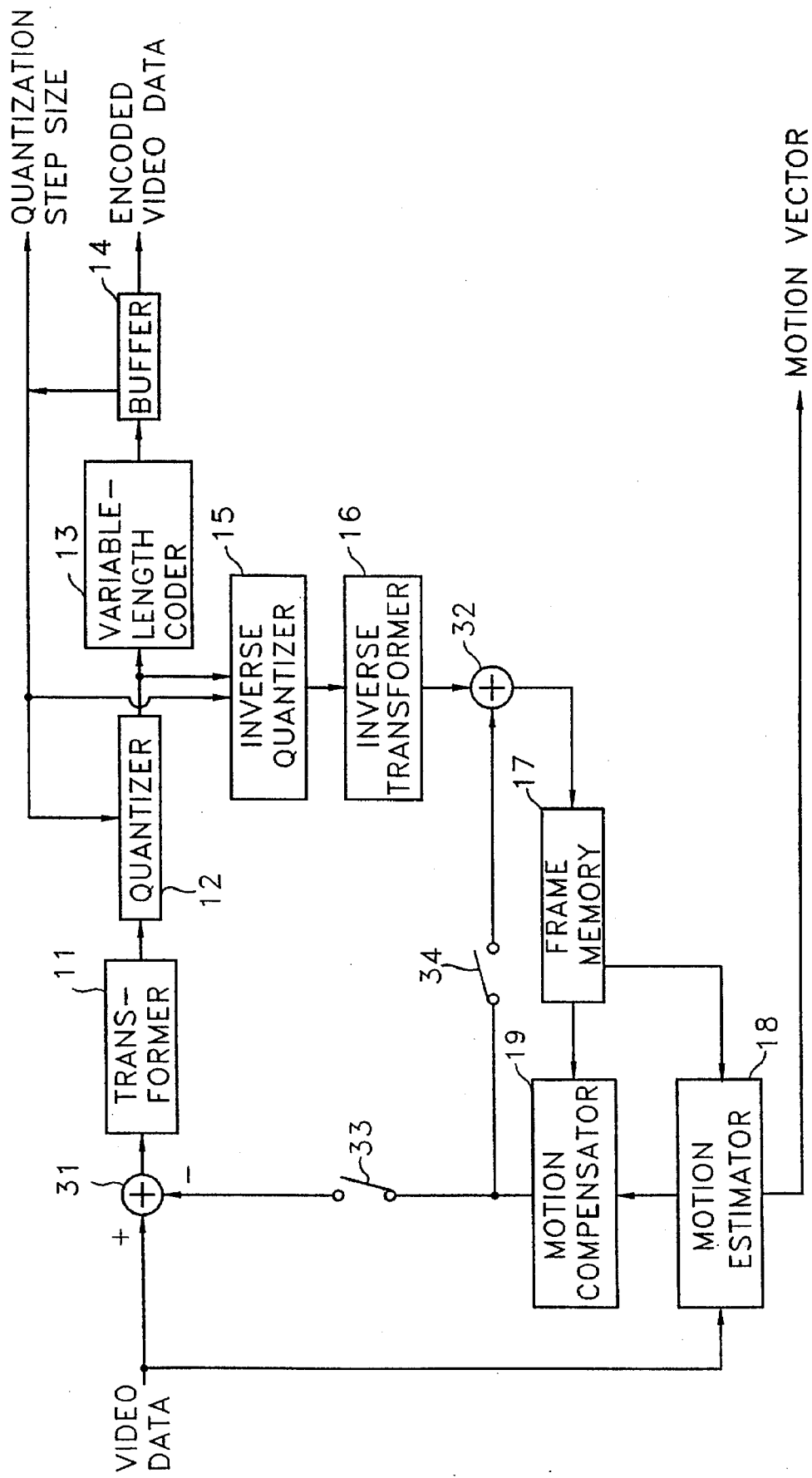
FIG. 1 is a block diagram showing a general encoder.
Figure 2:
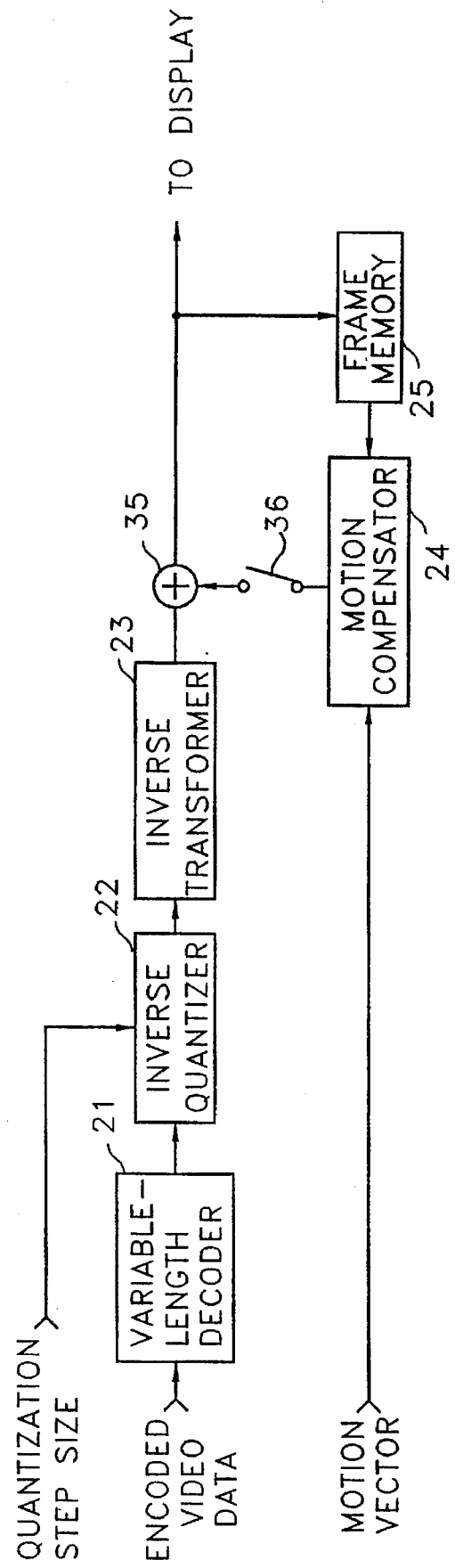
FIG. 2 is a block diagram showing a general decoder.

As shown In FIG. 3, a forward analyzer 41, a luminance analyzer 42, a neural network 43 and a picture quality estimator 44 are added to the FIG. 1 apparatus. In FIG. 3, since the same reference numerals are assigned to the blocks having the same functions as those shown in FIG. 1, the detailed descriptions thereof will be omitted.

Video data applied to the FIG. 3 apparatus via an input end 10 is supplied to forward analyzer 41, luminance analyzer 42, a motion estimator 18 and a subtracter 31. Forward analyzer 41 determines image complexity FA every block which is formed by the video data applied via input end 10. Here, the block is composed of N(the number of horizontal pixels)×N(the number of vertical pixels) pixels. Image complexity FA is determined on the basis of the analysis of the data obtained by using a spatial domain, a frequency domain, or both the spatial and frequency domains. Luminance analyzer 42 detects also luminance value BR representative of each of the above-described every blocks, and outputs the detected luminance value BR to neural network 43. Motion estimator 18 performs a motion estimation operation according to the manner described with reference to the FIG. 1 apparatus, and generates a motion vector MV for every block. The generated motion vector MV is supplied to neural network 43 and variable-length coder 45. Variable-length coder 45 variable-length-codes the motion vector and outputs the variable-length-coded motion vector to buffer 14. Neural network 43 generates a quantization step size MQUANT for every block or every macroblock composed of a plurality of blocks, according to the manner to be described later. Quantizer 12 quantizes the data applied from transformer 11 according to quantization step size MQUANT and outputs the quantized data to variable-length coder 13 and inverse quantizer 15.

Buffer 14 stores the data supplied from variable-length coders 13 and 45, and outputs buffer fullness BF according to the stored data to neural network 43. Here, buffer fullness BF represents a ratio of actual data stored in buffer 14 with respect to a total capacity of the data storage in buffer 14. On the other hand, picture quality estimator 44 restores the data output from variable-length coder 13 according to quantization step size MQUANT. The data restoring requires a corresponding quantization step size supplied from neural network 43. Picture quality estimator 44 generates a judgement reference value with which a blocking effect cannot be visually recognized at minimum on the basis of the restored data. The judgement reference value is generated every block or every macroblock.

When neural network 43 receives image complexity FA, luminance value BR and motion vector MV with respect to the block or macroblock to be quantized, and the judgement reference value and buffer fullness BF with respect to the block or macroblock which was last quantized, neural network 43 updates the weight values based on the judgement value, and then generates quantization step size MQUANT for quantizing each block by using the present buffer fullness BF, and image complexity FA, luminance value BR and motion vector MV which are generated every block. Such a neural network 43 can be designed in a modified structure for generating quantization step size MQUANT by using image complexity FA or luminance value BR, and the present buffer fullness BF supplied from buffer 14. Also, when the FIG. 3 apparatus is designed to comply with "MPEG-2" standard which defines a macroblock composed of four blocks, neural network 43 generates quantization step size MQUANT every macroblock.

Such a neural network 43 can be realized on the basis of the known neural network theory. In an embodiment of the present invention, a three-layer neural network has been used for realization of the neural network. The three-layer neural network has input ends, an output layer, and first and second hidden layers respectively located between the input ends and the output layer, in which each layer is composed of neuron nodes. Each neuron node of the first hidden layer is connected to all the input ends, while each neuron node of the second hidden layer is connected to all the neuron nodes of the first hidden layer. Also, each neuron node of the output layer is connected to all the neuron nodes of the second hidden layer. Synapses for connecting the nodes are assigned with a weight value, respectively. The weight value is varied according to the update rule until the weight value will be the optimum value.

When neural network 43 receives the judgement reference value of the previous block or macroblock from picture quality estimator 44, the former 43 adapts the judgement reference value to the update rule and updates the weight values used for generation of quantization step size MQUANT of the previous block or macroblock. Also, neural network 43 uses the present buffer fullness BF, and image complexity FA, luminance values BR and motion vectors MV with respect to the present block or macroblock to be quantized, and generates quantization step size MQUANT with respect to the present block or macroblock. The generated quantization step size MQUANT is supplied to quantizer 12, picture quality estimator 44 and a transmission channel. Quantizer 12 quantizes the data of the present block or macroblock supplied from transformer 11 according to quantization step size MQUANT corresponding to the data. That is, quantizer 12 quantizes the data supplied from transformer 11, so that a block or macroblock in which a boundary line between the blocks or the macroblocks is visually recognized is assigned with a relatively large number of bits, while the block or macroblock in which the former is not so well visually recognized is assigned with a relatively small number of bits. Thus, the data encoded by the FIG. 3 apparatus is regenerated into an image in which a boundary line between blocks or macroblocks is not so visually recognized. The data output via quantizer 12 and variable-length coder 13 is used for generation of a judgement reference value for the following block or macroblock. Buffer 14 supplies the data supplied from variable-length coders 13 and 45 to a decoder (not shown) via a transmission channel at a constant transmission rate, and outputs new buffer fullness BF for the following block or macroblock.

As described above, the encoding apparatus using the neural network according to the present invention has an effect of maintaining a stable quality of picture, in which the neural network having a learning capability for rearranging conditions of determining the quantization step size is used to determine the quantization step size, to thereby avoid the boundary line between the blocks of the restored image from being well recognized visually when the quantized data is restored.

While only certain embodiments of the invention have been specifically described herein, it will be apparent that numerous modifications may be made thereto without departing from the spirit and scope of the invention.

What is claimed is:

1. An apparatus for controlling a quantization step size for use in an encoder which divides one image frame into first blocks, each of said first blocks having predetermined dimensions, encodes the divided first blocks and transmits the encoded data at a constant transmission rate, said quantization step size control apparatus comprising:

a forward analyzer for detecting image complexity with respect to each of said first blocks to be quantized;

a luminance analyzer for outputting a luminance value representative of each of said first blocks;

a picture quality estimator for restoring quantized data by using a quantization step size corresponding to the quantized data and generating a judgement reference value corresponding to a minimum blocking effect which cannot be visually recognized on the basis of the restored quantized data of a second block, said second block being composed of a predetermined number of said first blocks;

a buffer for storing the quantized data and outputting buffer occupancy of the stored data;

a neural network for storing weight values for the neural network and an update rule for updating the weight values, updating the stored weight values according to the judgement reference value of the picture quality estimator with respect to the second block which has been next-previously quantized and the stored update rule, generating a quantization step size for a present second block on the basis of at least one of information relating to the image complexity with respect to the present second block to be quantized and information relating to the luminance values with respect to the present second block to be quantized, the buffer occupancy output from the buffer and the updated weight values, and supplying the generated quantization step size to the picture quality estimator; and a quantizer for quantizing respective data of the second blocks encoded by the encoder according to a corresponding quantization step size supplied from the neural network.

2. The quantization step size control apparatus according to claim 1, wherein said second block consists of one of said first blocks.

3. The quantization step size control apparatus according to claim 1, wherein said second block is composed of a plurality of said first blocks.

4. The quantization step size control apparatus according to claim 1, wherein said picture quality estimator outputs the judgement reference value with respect to the present second block on the basis of the data of the second block which has been next-previously quantized.

5. The quantization step size control apparatus according to claim 1, wherein said neural network generates the quantization step size for the present second block on the basis of the image complexity corresponding to the present second block, the buffer occupancy and the updated weight values.

6. The quantization step size control apparatus according to claim 1, wherein said neural network generates the quantization step size for the present second block on the basis of the luminance values corresponding to the present second block, the buffer occupancy and the updated weight values.

7. The quantization step size control apparatus according to claim 1, wherein said neural network generates the quantization step size for the present second block on the basis of the image complexity and the luminance values corresponding to the present second block, the buffer occupancy and the updated weight values.

8. An encoding apparatus for controlling a quantization step size in order to divide one image frame into first blocks each of which has predetermined dimensions, to encode the first blocks and to transmit the encoded data at a constant transmission rate, said encoding apparatus comprising;

a motion compensator for generating motion vectors and motion-compensated data corresponding to each first block of a present frame on the basis of pre-stored reference frame data and present frame data to be encoded;

encoder means for generating differential data between the respective first block data of the present frame and the corresponding motion-compensated data output from the motion compensator, and transforming and encoding the differential data generated in correspondence with each first block;

a forward analyzer for detecting image complexity with respect to each first block of the present frame;

a luminance analyzer for outputting a luminance value representative of each first block of the present frame;

a quantizer for quantizing respective data of second blocks encoded by the encoder and composed of a predetermined number of the first blocks of the present frame, according to a corresponding quantization step size;

means for variable-length-coding the data quantized by the quantizer and outputting the result;

a picture quality estimator for restoring the data quantized by the quantizer and generating a judgement reference value corresponding to a minimum blocking effect which cannot be visually recognized on the basis of the restored data every second block;

a buffer for storing the data output from the variable-length coder and outputting buffer occupancy of the stored data; and a neural network for storing weight values for the neural network and an update rule for updating the weight values, updating the stored weight values according to the judgement reference value of the picture quality estimator with respect to the second block which has been next-previously quantized and the stored update rule, and generating a quantization step size for the present second block on the basis of at least one of information relating to the motion vectors, information relating to the image complexity with respect to the present second block to be quantized and information relating to the luminance values with respect to the present second block to be quantized, the buffer occupancy output from the buffer and the updated weight values.

9. The quantization step size control apparatus according to claim 8, wherein said second block is composed of a single first block.

10. The quantization step size control apparatus according to claim 8, wherein said second block is composed of a plurality of said first blocks.

11. The quantization step size control apparatus according to claim 8, wherein said picture quality estimator outputs the judgement reference value with respect to the present second block on the basis of the data of the second block which was next-previously quantized.

12. The quantization step size control apparatus according to claim 8, wherein said neural network generates the quantization step size for the present second block on the basis of the image complexity corresponding to the present second block, the buffer occupancy and the updated weight values.

13. The quantization step size control apparatus according to claim 8, wherein said neural network generates the quantization step size for the present second block on the basis of the luminance values corresponding to the present second block, the buffer occupancy and the updated weight values.

14. The quantization step size control apparatus according to claim 8, wherein said neural network generates the quantization step size for the present second block on the basis of the image complexity and the luminance values corresponding to the present second block, the buffer occupancy and the updated weight values.

15. The quantization step size control apparatus according to claim 8, wherein said neural network generates the quantization step size for the present second block on the basis of the motion vectors, the image complexity and the luminance values corresponding to the present second block, the buffer occupancy and the updated weight values.

* * * * *